United States Patent [19]
Dunbobbin et al.

[11] Patent Number: 5,644,932
[45] Date of Patent: Jul. 8, 1997

[54] USE OF STRUCTURED PACKING IN A MULTI-SECTIONED AIR SEPERATION UNIT

[75] Inventors: Brian Roy Dunbobbin, Fogelsville; Douglas Leslie Bennett, Allentown; Mark Robert Pillarella, Macungie, all of Pa.

[73] Assignee: Air Products and Chemicals, Inc., Allentown, Pa.

[21] Appl. No.: 651,032

[22] Filed: May 21, 1996

[51] Int. Cl.⁶ .................................................. F25J 3/04
[52] U.S. Cl. .................................. 62/640; 62/906
[58] Field of Search .............................. 62/640, 643, 906

[56] References Cited

U.S. PATENT DOCUMENTS

| | | | |
|---|---|---|---|
| Re. 34,038 | 8/1992 | Bennett et al. | 62/906 X |
| 4,186,159 | 1/1980 | Huber | 261/112.2 |
| 4,296,050 | 10/1981 | Meier | 261/112.2 |
| 4,455,339 | 6/1984 | Meier | 428/185 |
| 4,497,753 | 2/1985 | Streiff | 261/95 |
| 5,019,144 | 5/1991 | Victor et al. | 62/906 X |
| 5,100,448 | 3/1992 | Lockett et al. | |
| 5,132,056 | 7/1992 | Lockett et al. | 261/112.2 |
| 5,419,136 | 5/1995 | McKeigue | 62/906 X |
| 5,454,988 | 10/1995 | Maeda | 261/112.2 |

FOREIGN PATENT DOCUMENTS 0321163  6/1989  European Pat. Off. .

OTHER PUBLICATIONS

Dunbobbin et al. "A Unified Model for Countercurrent Vapor/Liquid Packed Columns. 2. Equations for the Mass-Transfer Coefficients, Mass-Transfer Area, the HETP, and the Dynamic Liquid Holdup", Ind. Eng. Chem. Res. 1994, 33, pp. 1222–1230.

Dunbobbin et al. "A Unified Model for Countercurrent Vapor/Liquid Packed Columns. 1. Pressure Drop", Ind. Eng. Chem. Res. 1994, 33 pp. 1208–1221.

Primary Examiner—Christopher Kilner
Attorney, Agent, or Firm—Willard Jones, II

[57] ABSTRACT

The present invention is a process for the cryogenic separation of air to recover at least one of its constituent components, which is carried out in an air separation unit having at least one distillation column; wherein the distillation column has at least two mass transfer sections, wherein, in each mass transfer section, a flow of vapor and a flow of liquid are counter-currently contacted to accomplish mass transfer and the flow of vapor or liquid or vapor and liquid is different in one section as compared to the other section; wherein contact of the flows of vapor and liquid in each mass transfer section is accomplished using a structured packing; wherein the structured packing comprises elements which are corrugated with substantially parallel corrugations, wherein the parallel corrugations have a longitudinal axis at an angle β relative to horizontal and wherein each corrugation when approximated to be a triangular cross-section has a crimp angle α defined by the two sides of the corrugation; characterized in that the structured packing used in each mass transfer section have different angles α and/or β selected such that each mass transfer section is operated in the loading region at which the dimensionless grouping S is in the range between substantially $3.0 \times 10^{-6}$ and substantially $8.0 \times 10^{-6}$, where $S=T_i m/\sigma$, wherein $T_i$ is the shear stress at the liquid-vapor interface ($kgm^{-1}s^{-2}$), m is the film thickness of liquid flowing over the element (m), and σ is the surface tension of the liquid ($kgs^{-2}$).

14 Claims, 4 Drawing Sheets

SINGLE STRUCTURE PACKING SHEET

USE OF STRUCTURED PACKING IN A MULTI-SECTIONED AIR SEPERATION UNIT

FIELD OF THE INVENTION

The present invention relates to air separation units. In particular, the present invention relates to optimization of the performance of an air separation unit.

BACKGROUND OF THE INVENTION

In many processes, such as distillation or direct contact cooling, it is advantageous to use structured packing to promote heat and mass transfer between liquid and vapor streams which flow counter-currently to each other inside a column. Structured packing offers the benefit of high efficiency for heat and mass transfer combined with low pressure drop, when it is compared with dumped or random packing or with distillation trays. The most commonly used structured packing consists of corrugated sheets of metal or plastics foil or corrugated mesh cloths stacked vertically. While there are many types of structured packing described in the prior art, some of which are discussed below, they have evolved from a variety of applications and most have not been developed or optimized specifically for cryogenic separation processes, such as those used for separating the components of air.

EP-A-0321163 discloses the use of structured packing in a cryogenic air separation unit.

U.S. Pat. No. 5,100,448 (Lockett et al.) discloses that geometrically similar packing but of differing specific area can be used in different sections to maintain a common column diameter. The problem with this approach is that adjusting the packing density can have a significant negative impact on installed cost since there are only two alternatives: 1) increasing the packing density which decreases capacity but results in a significant increase in the cost of packing due to the increase in the amount of surface area per volume of packing, or 2) decreasing the specific density which increases capacity but at the expense of increasing the HETP (discussed below). This reduction in performance increases the height of packing required for separation or, if the column height is fixed, decreases the overall column performance. Thus this practice does not make full and effective utilization of the column volume and height which, for air separation plants, is of paramount importance.

U.S. Pat. No. 5,132,056 (Lockett et al.) describes a structured packing with corrugations and surface texture and also discloses the use of edge modification to improve wetting, especially under turndown conditions.

U.S. Pat. No. 5,454,988 (Maeda) discloses the use of special fluting in a corrugated packing with no holes. The fluting generally runs in a horizontal direction and is more square-wave like than sine-wave like in cross-section. The fluting also has a meandering flow path for laterally spreading liquid.

In Ind. Eng. Chem. Res. 1994, 33, pp1208–1221 and Ind. Eng. Chem. Res. 1994, 33, pp1222–1230, the disclosures of both of which are incorporated herein by reference, there is a discussion of a model for a two-phase pressure drop in a packed column.

It is also well-known in the prior art that mesh type packing helps spread liquid efficiently and gives good mass transfer performance, but mesh type of packing is much more expensive than most of the foil type packing described above.

SUMMARY OF THE INVENTION

According to a first aspect of the present invention, there is provided a process for the cryogenic separation of air to recover at least one of its constituent components, which is carried out in an air separation unit having at least one distillation column; wherein the distillation column has at least two mass transfer sections, wherein, in each mass transfer section, a flow of vapor and a flow of liquid are counter-currently contacted to accomplish mass transfer and the flow of vapor or liquid or vapor and liquid is different in one section as compared to the other section; wherein contact of the flows of vapor and liquid in each mass transfer section is accomplished using a structured packing; wherein the structured packing comprises elements which are corrugated with substantially parallel corrugations, wherein the parallel corrugations have a longitudinal axis at an angle $\beta$ relative to horizontal and wherein each corrugation when approximated to be a triangular cross-section has a crimp angle $\alpha$ defined by the two sides of the corrugation; characterized in that the structured packing used in each mass transfer section have different angles $\alpha$ and/or $\beta$ selected such that each mass transfer section is operated in the loading region at which the dimensionless grouping S is in the range between substantially $3.0 \times 10^{-6}$ and substantially $8.0 \times 10^{-6}$, where $S = T_i m/\sigma$, wherein $T_i$ is the shear stress at the liquid-vapor interface ($kgm^{-1}s^{-2}$), m is the film thickness of liquid flowing over the element (m), and $\sigma$ is the surface tension of the liquid ($kgs^{-2}$).

Angle $\beta$ may be greater than 0° and less than 90°. Preferably, angle $\beta$ is in the range between 30° and 60°. Most preferably, angle $\beta$ is substantially 45°.

Angle $\alpha$ may be in the range between 60° and 120°. Preferably, angle $\alpha$ is 90°.

The structured packing used in each mass transfer section may have a different internal diameter.

According to a second aspect of the present invention, there is provided, in an air separation unit in which there are countercurrent flows of liquid and vapor over at least one structured packing element, use of a dimensionless grouping $S = T_i m/\sigma$ to optimize the performance of the structured packing element, where $T_i$ is the shear stress at the liquid-vapor interface ($kgm^{-1}s^{-2}$), m is the film thickness of liquid flowing over the element (m), and $\sigma$ is the surface tension of the liquid ($kgs^{-2}$).

The structured packing element is preferably corrugated with corrugations, each corrugation having a longitudinal axis which is at an angle greater than zero to the horizontal.

S is preferably constrained to be within the range $3.0 \times 10^{-6}$ to $8.0 \times 10^{-6}$.

According to a third aspect of the present invention, there is provided an air separation unit having a distillation column, said column having at least two sections, each section having a plurality of structured packing elements, the configuration and orientation of said structured packing elements being selected so that the dimensionless grouping S is in the range $3.0 \times 10^{-6}$ to $8.0 \times 10^{-6}$ for all sections, where $S = T_i m/\sigma$, $T_i$ being the shear stress at the liquid-vapor interface ($kgm^{-1}s^{-2}$), m being the film thickness of liquid flowing over the element (m), and $\sigma$ being the surface tension of the liquid ($kgs^{-2}$).

The sections may have substantially the same internal diameter.

In use, in a preferred embodiment, the adjacent sheets of the packing elements are stacked vertically, the corrugations running in a crisscrossing and opposing fashion; the sheets of the packing elements build up a layer which covers a cylindrical section of a packed tower, which itself is configured as a tall vertical cylinder; the many layers that constitute the packed section of a given column or tower are rotated relative to one another about the column axis which is generally vertical; and vapor and liquid are fed via distributors and preferably flow in roughly countercurrent directions.

In this specification, the following nomenclature will be used:

| | |
|---|---|
| B | peak-to-peak distance for a corrugation channel (m) |
| $D_H$ | hydraulic diameter, $4A/P$ (m) |
| $f$ | friction factor, dimensionless |
| $g$ | gravity ($ms^{-2}$) |
| $g_c$ | gravity constant (=1.0) |
| h | height of a corrugation channel (m) |
| m | liquid film thickness (m) |
| P/A | available packing perimeter (4S + 2B, include both sides of the packing sheet) per unit of superficial distillation column area (Bh) for a triangular cross-section ($m^{-1}$) |
| $Re_{V-only}$ | vapor-only Reynolds number, $\rho_v VD_H/\mu_v$, dimensionless |
| S | $S = \tau_i m/\sigma$, dimensionless |
| V | superficial vapor velocity ($ms^{-1}$) |
| $\alpha$ | crimp angle, angle between two sides of a corrugation channel (degrees) |
| $\beta$ | angle of corrugation channel with respect to the horizontal direction (degrees) |
| $\Delta P/\Delta L$ | vapor pressure gradient in the vertical direction through a packed distillation column with liquid flow ($kgm^{-2}s^{-2}$) |
| $\Delta P/\Delta L_{V-only}$ | vapor pressure gradient in the vertical direction through a packed distillation column without liquid flow ($kgm^{-2}s^{-2}$) |
| $\Gamma$ | liquid mass flow rate per unit width of packing ($kgm^{-1}s^{-1}$) |
| $\mu_L$ | liquid viscosity ($kgm^{-1}s^{-1}$) |
| $\rho_L$ | liquid density ($kgm^{-3}$) |
| $\rho_V$ | vapor density ($kgm^{-3}$) |
| $\sigma$ | surface tension ($kgs^{-2}$) |
| $\tau_i$ | shear stress at the liquid vapor interface ($kgm^{-1}s^{-2}$) |

BRIEF DESCRIPTION OF THE DRAWINGS

Embodiments of the invention will now be described by way of example with reference to the accompanying drawings, in which.

DETAILED DESCRIPTION OF THE INVENTION

In a distillation column, there is a mass transfer resistance within the liquid and within the vapor. Analysis of the total mass transfer is usually approached through the concept of the height of an overall transfer unit which includes consideration of both resistances. Another convenient method of displaying data is through the Height Equivalent to a Theoretical Plate (HETP). The HETP is a well-known method in the art to compare different types of packing and means the height over which a composition change is achieved which is equivalent to the composition change achieved by a theoretical plate. The HETP is widely used and reported because of its ease of application, but is generally only directly applicable for equal systems.

Figure 1:
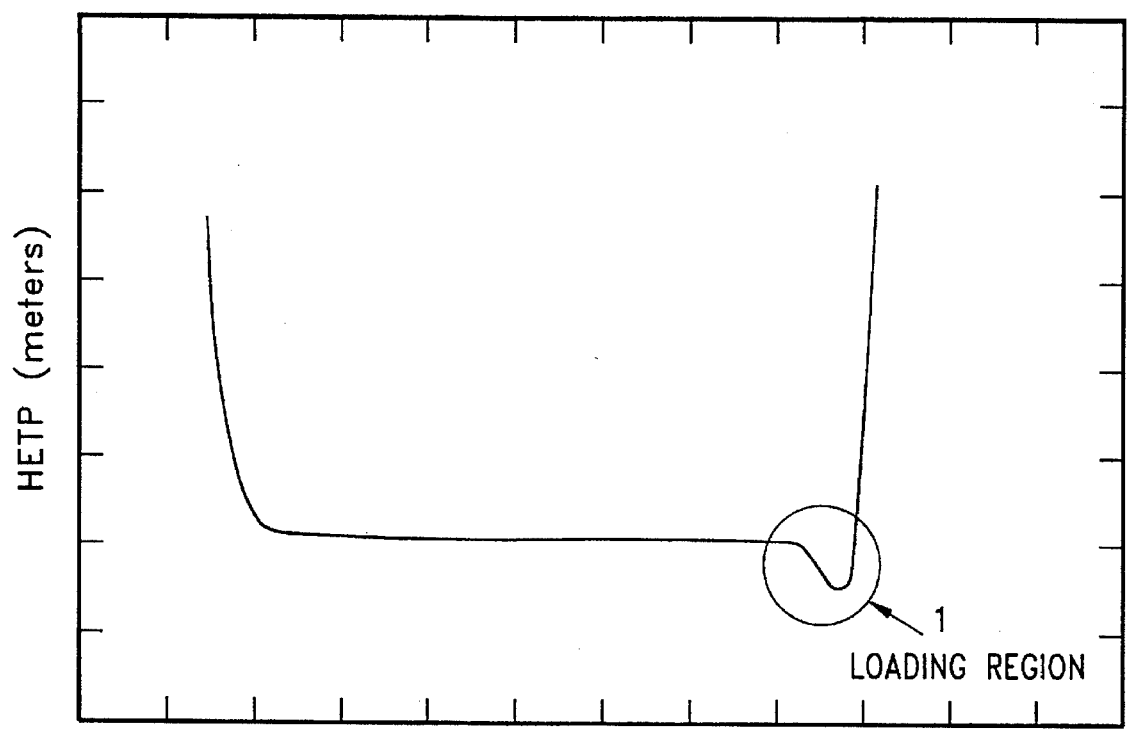
FIG. 1 is a graph showing HETP versus density-corrected vapor velocity.

A typical plot of HETP versus the density corrected vapor velocity through the packing is illustrated in FIG. 1. Lower values of HETP indicate better performance since more theoretical stages will be obtained per packing section height. At low values of vapor throughput, the HETP increases. This is believed to occur because of increases in mass transfer resistance and at times less than complete wetting. At higher vapor throughputs, flooding occurs and again performance decreases. This is thought to result in part from backflow of liquid which degrades the overall performance. A similar effect is seen in distillation trays as liquid entrainment from a new tray to the tray above degrades the driving force and decreases the column performance. There is often an improvement in performance, seen as a decrease in the HETP, which occurs at an intermediate vapor throughput. This improvement is known as the loading region 1, and the explanation for the improvement is somewhat unclear, but has been associated with increased turbulence as flood is approached.

Design of the distillation column around the loading region can improve the HETP by around 10% or more. For distillation columns which must be designed within a specified height, or where height is a very important consideration, such as in air separation, design of a column to operate within the loading region has particular value.

Figure 2A:
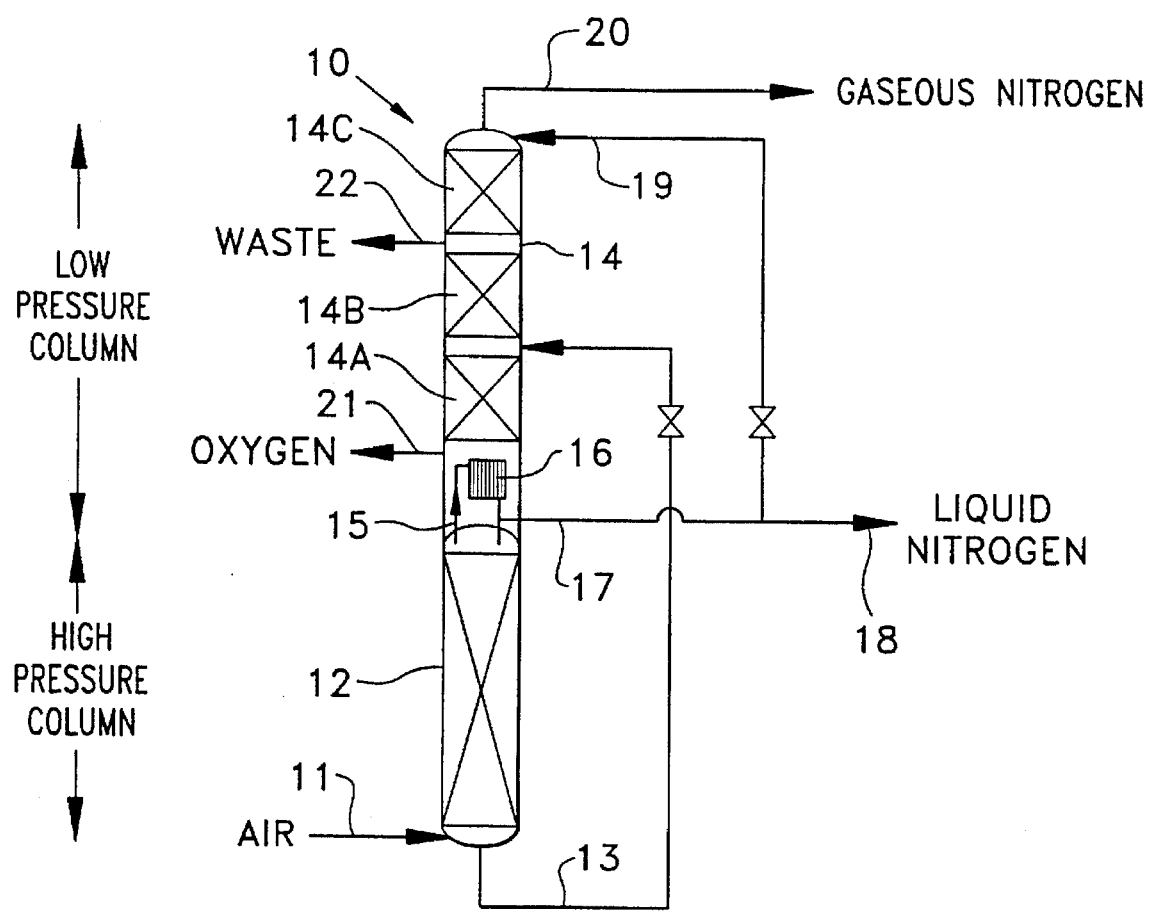
FIG. 2A is a schematic elevation of an air separation unit.

A typical cryogenic air separation unit 10 is shown schematically in FIG. 2A. High pressure feed air 11 is fed into the base of a high pressure distillation column 12. Within the high pressure distillation column 12, the air is separated into nitrogen-enriched vapor and oxygen-enriched liquid. The oxygen-enriched liquid 13 is passed from the high pressure column 2 into a low pressure distillation column 14. Nitrogen-enriched vapor 15 is passed into a condenser 16 where it is condensed by heat exchange to provide reboil to the low pressure column 14. The nitrogen-enriched liquid 17 is partly tapped 18 and is partly passed 19 into the low pressure column 14 as liquid reflux. In the low pressure column 14, the feeds are separated by cryogenic distillation into oxygen-rich and nitro-rich components. The nitrogen-rich component is removed as a vapor 20. The oxygen-rich component is removed as a liquid 21. A waste stream 22 is also removed from the low pressure column 14. The low pressure column can be divided into between two and eight sections for example. Three (14A, 14B, 14C) such sections are shown in FIG. 2A by way of example.

Figure 2B:
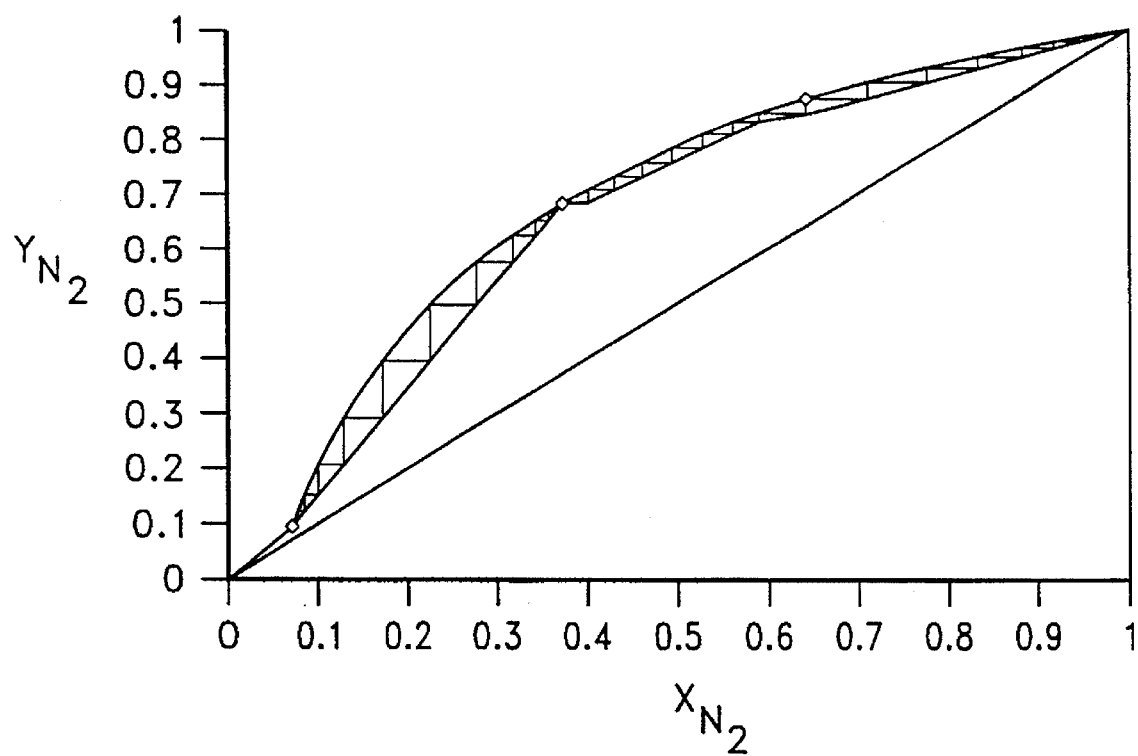
FIG. 2B is a graph showing a McCabe-Thiele plot for a low pressure column.

In air separation plants, the requirement for very high thermodynamic efficiency has resulted in cycles which allow the operating line to nearly parallel the equilibrium curve throughout most of the separation. FIG. 2B illustrates a representative McCabe-Thiele diagram which illustrates this practice. The result of this close matching of the operating line and the equilibrium line is that the low pressure column is often made up of many sections. Since the slope of the equilibrium line varies throughout the distillation within the low pressure column 14, the liquid to vapor ratio must also change significantly through the low pressure column 14.

The economic use of column height has for years resulted in different tray spacings being utilized in trayed low pressure columns. In general, all sections are designed at approximately the same approach to flood.

An important phenomenon which, in part, explains the improved performance in the loading region is the presence of significant amounts of waves at the liquid-vapor interface. Waves on vertical wet surfaces have been studied by applying fluid flow analysis on both the liquid film and the vapor core. Waves are an instability. If a wave occurs, the pressure profile resulting from the vapor flow near the crest of the wave is less than that at the trough of the wave. This pressure difference tends to make the amplitude of the wave increase. The surface tension, in contrast, tends to limit the magnitude of the wave. Since the entrainment mechanism is integrally based on the generation of waves and their breakup into droplets, the present inventors have appreciated that the dimensionless grouping $S=T_i m/\sigma$ would be important for describing the loading region of structured packing. In this definition for S, $T_i$ is the shear stress at the liquid-vapor interface, m is the film thickness and $\sigma$ is the surface tension. The shear stress $T_i$ can be estimated from the shear stress at a dry wall rather than a wet wall:

$$\tau_i = \frac{D_H}{4} \frac{\Delta P}{\Delta L} = \frac{f}{8} \frac{\rho_v V^2}{g_c}$$

and m is given by:

$$m = \left[ \frac{3\mu_L \Gamma}{\rho_L(\rho_L - \rho_v)g} \right]^{1/3}$$

Therefore, S is determined from:

$$S = \frac{\sqrt[3]{3}}{8\sigma g_c} f \rho_v V^2 \left[ \frac{\mu_L \Gamma}{\rho_L(\rho_L - \rho_v)g} \right]^{1/3}$$

where f is given by:

$$\frac{\Delta P}{\Delta L_{V\text{-only}}} = \frac{f}{D_H} \frac{\rho_v V^2}{2g_c}$$

This gives an equivalent expression for S of:

$$S = \frac{\sqrt[3]{3} D_H}{4\sigma} \left[ \frac{\mu_L \Gamma}{\rho_L(\rho_L - \rho_v)g} \right]^{1/3} \cdot \left[ \frac{\Delta P}{\Delta L} \right]_{V\text{-only}}$$

Possible S-values for air separation columns range from about $0.5 \times 10^{-6}$ to about $40 \times 10^{-6}$ where the units are as mentioned above.

The present inventors have discovered that different packing designs yield minimum values of HETP (Loading Points) in ranges for the S-value of $3.0 \times 10^{-6}$ to $8.0 \times 10^{-6}$ where the units are as mentioned above. The S-value can be adjusted by changing the specific area but keeping geometric similarity or by changing the shape of the structured packing.

Figure 3:
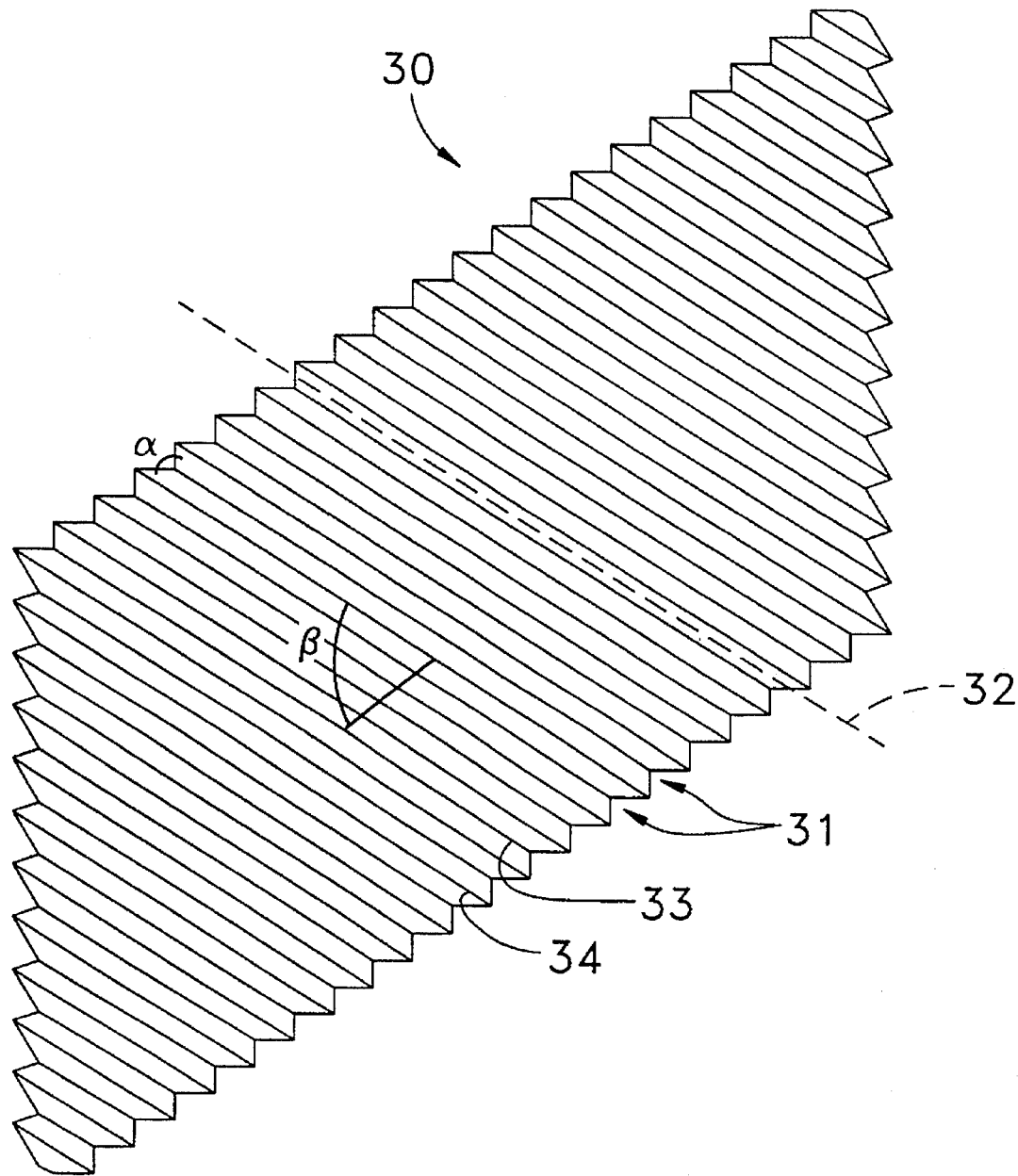
FIG. 3 is a perspective view of a structured packing element.

In FIG. 3, there is shown a perspective view of a structured packing element 30. The element 30 is a sheet-like structure and is provided with regularly spaced corrugations 31, each corrugation having a longitudinal axis 32 and which form peaks 33 and troughs 34 in the element 30. It will be appreciated that a peak viewed from one side of the element 30 will be a trough when viewed from the other side of the element 30 and vice versa. In use in a cryogenic air separation column 10 for example, the element 30 is packed vertically. The longitudinal axes 32 of the corrugations 32 are at an angle β to the horizontal. The corrugations 2 are generally sinusoidal and this is believed to be the configuration which provides optimum performance. However, different profiles for the corrugations 31 are possible, such as, for example, pleated, square wave, triangular wave, sawtooth wave. Most designs of corrugation 31 can be approximated to be of triangular cross-section, and the angle α is defined as the angle between the two sides of the triangle as shown in FIG. 3. The angle α is sometimes known as the crimp angle. In practice, α may be in the range of 60° to 120° and is often 90°; β may be between 10° and 90° and is typically in the range of 30° to 60° and preferably 45°.

It is highly desirable to have a common column diameter throughout a multi-section column, and also to have all sections operating within the optimal loading region, yet with a low value of HETP. This has not been previously possible. The present invention permits such a design by using structured packing elements 30 in two or more sections 14A, 14B, 14C, and changing the design of the packing elements 30 by using geometries which give different values for f. This is accomplished through altering the angles α and/or β. Changing the angle α changes specific area with a lesser impact on pressure drop. Changing the angle β does not change the specific area, but allows a greater adjustment to pressure drop, thereby permitting adjustment to be made so that the value of S is in the desirable range mentioned above without any change in surface area. The current teaching for the application of structured packing elements 30 in air separation columns 10 is based on the low pressure drop of packing. An unexpected aspect of the present invention is that the pressure drop should be increased in certain regions of the column to enhance the overall column performance. As the pressure drop is increased, which results from a decrease in the angle β, the HETP will decrease, thereby allowing better utilization of column height. If this is not advantageous, angle α can be increased, returning the HETP, for example, to the same value but saving surface area and packing cost. Such adjustment to the packing design in at least two or more sections is of particular value to air separation where large numbers of stages are required within a relatively modest height.

Although actual data can be used to determine the vapor-only pressure gradient, the impact of geometry on the gradient can be estimated using the following equations:

$$\frac{\Delta P}{\Delta L_{V\text{-only}}} = \frac{f}{D_H} \frac{\rho_v V^2}{2g_c}$$

where $$f = 26.93 \, (2\pi\beta/360)^{-0.910} Re_{V\text{-only}}^{-0.262} \quad 10° < \beta < 30°$$

$$f = 3.03 \, (2\pi\beta/360)^{-3.56} Re_{V\text{-only}}^{-0.216} \quad 30° < \beta < 60°$$

$$f = 4.44 \, (2\pi\beta/360)^{-4.62} Re_{V\text{-only}}^{-0.263} \quad 60° < \beta < 90°$$

and $Re_{V\text{-only}}$ is the vapor-only Reynold's number.

The present invention has been described with particular reference to the examples illustrated. However, it will be appreciated that variations and modifications may be made to the example described within the scope of the present invention.

We claim:

1. A process for the cryogenic separation of air to recover at least one of its constituent components, which is carried out in an air separation unit having at least one distillation column; wherein the distillation column has at least two mass transfer sections, wherein, in each mass transfer section, a flow of vapor and a flow of liquid are counter-currently contacted to accomplish mass transfer and the flow of vapor or liquid or vapor and liquid is different in one section as compared to the other section; wherein contact of the flows of vapor and liquid in each mass transfer section is accomplished using a structured packing; wherein the structured packing comprises elements which are corrugated with substantially parallel corrugations, wherein the parallel corrugations have a longitudinal axis at an angle β relative to horizontal and wherein each corrugation when approximated to be a triangular cross-section has a crimp angle α defined by the two sides of the corrugation; characterized in that the structured packing used in each mass transfer section have different angles α and/or β selected such that each mass transfer section is operated in the loading region at which the dimensionless grouping S is in the range between substantially $3.0-10^{-6}$ and substantially $8.0 \times 10^{-6}$, where $S = T_i m/\sigma$, wherein $T_i$ is the shear stress at the liquid-vapor interface ($kgm^{-1}s^{-2}$), m is the film thickness of liquid flowing over the element (m), and o is the surface tension of the liquid ($kgs^{-2}$).

2. The process of claim 1 wherein angle β is greater than 0° and less than 90°.

3. The process of claim 1 wherein angle β is in the range between 30° and 60°.

4. The process of claim 1 wherein angle β is substantially 45°.

5. The process of claim 1 wherein angle α is in the range between 60° and 120°.

6. The process of claim 1 wherein angle α is 90°.

7. The process of claim 5 wherein angle β is in the range between 30° and 60°.

8. The process of claim 1 wherein the structured packing used in each mass transfer section are further characterized by having a different internal diameter.

9. In an air separation unit in which there are countercurrent flows of liquid and vapor over at least one structured packing element, use of a dimensionless grouping $S = T_i m/\sigma$ to optimize the performance of the structured packing element, where $T_i$ is the shear stress at the liquid-vapor interface ($kgm^{-1}s^{-2}$), m is the film thickness of liquid flowing over the element (m), and σ is the surface tension of the liquid ($kgs^{-2}$).

10. The unit of claim 9 wherein the structured packing element is corrugated with corrugations, each corrugation having a longitudinal axis which is at an angle greater than zero to the horizontal.

11. The unit of claim 9 wherein S is constrained to be within the range $3.0 \times 10^{-6}$ to $8.0 \times 10^{-6}$.

12. The unit of claim 10 wherein S is constrained to be within the range $3.0 \times 10^{-6}$ to $8.0 \times 10^{-6}$.

13. An air separation unit having a distillation column, said column having at least two sections, each section having a plurality of structured packing elements, the configuration and orientation of said structured packing elements being selected so that the dimensionless grouping S is in the range $3.0 \times 10^{-6}$ to $8.0 \times -6$ for all sections, where $S = T_i m/\sigma$, $T_i$ being the shear stress at the liquid-vapor interface ($kgm^{-1}s^{-2}$), m being the film thickness of liquid flowing over the element (m), and σ being the surface tension of the liquid ($kgs^{-2}$).

14. The unit of claim 13 wherein said sections have substantially the same internal diameter.

* * * * *